US011448772B2

(12) United States Patent
Fernàndez-Hernàndez

(10) Patent No.: US 11,448,772 B2
(45) Date of Patent: Sep. 20, 2022

(54) TRANSMISSION OF SATELLITE NAVIGATION MESSAGE INTO MULTIPLE PAGES ENCODED FOR OPTIMAL RETRIEVAL AT RECEIVER IN A FULLY INTERCHANGEABLE WAY

(71) Applicant: THE EUROPEAN UNION, REPRESENTED BY THE EUROPEAN COMMISSION, Brussels (BE)

(72) Inventor: Ignacio Fernàndez-Hernàndez, Etterbeek (BE)

(73) Assignee: THE EUROPEAN UNION, REPRESENTED BY THE EUROPEAN COMMISSION, Brussels (BE)

( * ) Notice: Subject to any disclaimer, the term of this patent is extended or adjusted under 35 U.S.C. 154(b) by 133 days.

(21) Appl. No.: 16/971,649

(22) PCT Filed: Oct. 3, 2019

(86) PCT No.: PCT/EP2019/076846
§ 371 (c)(1),
(2) Date: Aug. 20, 2020

(87) PCT Pub. No.: WO2020/074366
PCT Pub. Date: Apr. 16, 2020

(65) Prior Publication Data

US 2020/0393569 A1 Dec. 17, 2020

(30) Foreign Application Priority Data

Oct. 9, 2018 (EP) .................................... 18199280

(51) Int. Cl.
*G01S 19/24* (2010.01)
*G01S 19/02* (2010.01)
*G01S 19/27* (2010.01)

(52) U.S. Cl.
CPC ............ *G01S 19/246* (2013.01); *G01S 19/24* (2013.01); *G01S 19/243* (2013.01); *G01S 19/02* (2013.01); *G01S 19/27* (2013.01)

(58) Field of Classification Search
CPC ........ G01S 19/02; G01S 19/24; G01S 19/243; G01S 19/246; G01S 19/27

(Continued)

(56) References Cited

U.S. PATENT DOCUMENTS 7,587,653 B2 * 9/2009 Kim ...................... H03M 13/15
714/752
8,135,034 B2 * 3/2012 Song ..................... H04L 1/0065
370/476

(Continued)

FOREIGN PATENT DOCUMENTS

CA 2809546 A1 * 3/2013 ............... H04L 1/00
WO 2012/174933 A1 12/2012

(Continued)

OTHER PUBLICATIONS

International Search Report and Written Opinion dated Dec. 6, 2019, issued in corresponding International Application No. PCT/EP2019/076846 filed Oct. 3, 2019, 14 pages.

(Continued)

*Primary Examiner* — Chuong P Nguyen
(74) *Attorney, Agent, or Firm* — Christensen O'Connor Johnson Kindness PLLC

(57) ABSTRACT

Described herein is a method for improving the reception of a satellite navigation message divided in several pages and transmitted by one or several satellites. A satellite navigation (Continued)

900 message M of k pages is encoded inn pages, and any k retrieved pages from any satellite enables decoding of the original satellite navigation message M. An implementation of the method uses parallel block encoding for a binary erasure channel with high parity and zero overhead, where symbols at a fixed position of all pages are encoded in parallel into shorter codes. This method achieves full page interchangeability in the message transmission, optimizes message reception and reduces decoding cost.

12 Claims, 10 Drawing Sheets

(58) Field of Classification Search
USPC ........................ 342/357.395, 357.63, 357.66
See application file for complete search history.

(56) References Cited

U.S. PATENT DOCUMENTS

| | | | | |
|---|---|---|---|---|
| 8,294,611 | B2 * | 10/2012 | Trautenberg | G01S 19/02 342/357.39 |
| 8,320,296 | B2 * | 11/2012 | Becker | H04L 1/0003 370/320 |
| 8,630,223 | B2 * | 1/2014 | Yang | H04L 1/0083 370/316 |
| 9,854,546 | B2 * | 12/2017 | Grelier | H04L 7/04 |
| 10,327,216 | B2 * | 6/2019 | Simha | H04B 7/185 |
| 2004/0114547 | A1 * | 6/2004 | Christodoulides | H04L 1/0083 370/316 |
| 2013/0141278 | A1 * | 6/2013 | Rao | G01S 19/02 342/357.44 |
| 2013/0227377 | A1 * | 8/2013 | Rao | G06F 11/10 714/776 |
| 2014/0327575 | A1 * | 11/2014 | Rao | G01S 19/05 342/357.63 |
| 2015/0046776 | A1 | 2/2015 | Randhawa et al. | |
| 2016/0056920 | A1 | 2/2016 | Summerson et al. | |
| 2016/0282469 | A1 * | 9/2016 | Liu | G01S 19/05 |
| 2019/0257952 | A1 * | 8/2019 | Zhou | G01S 19/072 |

FOREIGN PATENT DOCUMENTS

| | | | | | |
|---|---|---|---|---|---|
| WO | 2017/216058 | A1 | | 12/2017 | |
| WO | WO-2021/006809 | A1 | * | 1/2021 | H04L 1/18 |

OTHER PUBLICATIONS

Fernàndez-Hernàndez, I., "Fountain Codes for GNSS," Proceedings of the 30th International Technical Meeting of the Satellite Division of the Institute of Navigation (Ion GNSS+ 2017), Sep. 29, 2017, pp. 1496-1507.

* cited by examiner

| Msg len [bits] | Msg./symbol pages (n) | Code Rate | Code pages/symbols (k) | Parity required: pages/symbols | symbol size [bits] | RS known codes |
|---|---|---|---|---|---|---|
| **8640** | 20 | 1/5 | 100 | 80 | 8 | RS(255,161) |
| **6912** | 16 | 1/6 | 96 | 80 | 8 | RS(255,161) |
| **4320** | 10 | 1/8 | 80 | 70 | 8 | RS(255,161) |
| **7776** | 18 | 1/4 | 72 | 54 | 8 | RS(255,195) |

*Fig. 5*

| page len [bits] | *432* | | | | | | | | | |
|---|---|---|---|---|---|---|---|---|---|---|
| | | | m | max pages/code | parallel codes/msg | containers | codes | k | dec. ops/code | dec. ops total |
| MSG SIZE - LONG [bits] | *8640* | Standard 1 | *16* | *20* | *1* | 1 | 1 | 540 | 157755600 | **157755600** |
| pages/msg | 20 | Standard 2 | *8* | *4* | *1* | 5 | 5 | 216 | 10124352 | **50621760** |
| | | MRSC | *8* | *20* | *54* | 1 | 54 | 20 | 8400 | **453600** |
| | | | | | | | | | | |
| MSG SIZE - SHORT [bits] | *1728* | Standard 1 | *8* | *4* | *1* | 1 | 1 | 216 | 10124352 | **10124352** |
| pages/msg | 4 | Standard 2 | *8* | *4* | *1* | 1 | 1 | 216 | 10124352 | **10124352** |
| | | MRSC | *8* | *4* | *54* | 1 | 54 | 4 | 80 | **4320** |

*Fig. 6*

|  | t=1 | t=2 | ... | t=T |
|---|---|---|---|---|
| SVID0 | id=1 | id=2 | id=3 | id=T |
| SVID1 | id=T+1 | id=T+2 |  |  |
| ... |  |  |  |  |
| SVIDn | id=n*T+1 ... |  |  | id=(n+1)*T |

TRANSMISSION OF SATELLITE NAVIGATION MESSAGE INTO MULTIPLE PAGES ENCODED FOR OPTIMAL RETRIEVAL AT RECEIVER IN A FULLY INTERCHANGEABLE WAY

FIELD OF THE INVENTION

The present disclosure relates to a method and system for optimized satellite navigation message transmission, and, is more particularly concerned with optimized encoding, transmission and decoding of a digital message from a plurality of satellites to at least one user receiver.

BACKGROUND OF THE INVENTION

Satellite navigation systems, such as GPS, GLONASS or Galileo, usually transmit messages of several hundred bits with the orbits and clock offsets of the transmitting satellites, so a user receiver can calculate its position. They may also need to transmit longer messages, of possibly more than a thousand bits, such as, almanacs, digital signatures, precise point positioning satellite data, or accurate ionospheric information. The bitrate allowed by navigation satellites is generally low, so the transmission of a long message requires the user receiver to receive satellite signals without bit errors for several seconds, or even minutes. This may not be possible in degraded reception and visibility conditions, such as, in urban canyons or under tree canopies. Tall buildings in cities tend to limit the number of satellites in view of a user receiver and the term “urban canyons” refers to the lack of signal due to such tall buildings which results in impaired data reception.

However, in order to improve data reception in fading channels due to urban canyons and under tree canopies, modern satellite navigation messages are usually encoded through various types of convolutional and block codes.

The reference document “Quasi-Zenith Satellite System Interface Specification Centimeter-Level Augmentation Service (IS-QZSS-L6-001) Draft Edition, 2017” describes the transmission of a high accuracy message of 2000 bits per second. Such a message comprises a header of 49 bits, a data part of 1695 bits, and a Reed-Solomon (RS) code, providing 256 bits of redundancy to correct errors within every message independently.

The reference document “European GNSS (Galileo) Open Service Signal In Space Interface Control Document, (OS SIS ICD V1.3)”, from the European Commission, proposes a forward error correction convolutional coding of rate=1/2 and length of 7, which is applied to every Galileo two-second page. By this coding layer, the Galileo data of a given two-second message can be demodulated even if the message is received with errors therein. This reference document also proposes the transmission of a long, intra-constellation message, which is the Almanac message, split in several shorter chunks, where Word Types 7, 8, 9 and 10 of the Galileo I/NAV subframe transmit the almanac for 3 satellites out of the total constellation.

While this approach is relatively easy to implement, it has some drawbacks, the main one being that the lack of reception of one chunk jeopardizes the reception of the full message.

WO-A-2017/216058 relates to a method of transmitting a navigation message comprising an outer Reed-Solomon (RS), encoding of Clock and Ephemeris data (CED), which further involves the use of a cyclic redundancy check (CRC). In this reference, a single RS code is applied to a CED message of some hundred bits, with a low parity. Therefore, this method, while useful for short messages from a single satellite, is not optimized for long messages transmitted from several satellites which have high parity/data ratios.

The article “Packet transmission through navigation satellites: A preliminary analysis using Monte Carlo simulations” by Fernández-Hernández, I., et al., ENC 2017 proposes to offset transmission of pages of the same satellite navigation message from different satellites. However, page offsetting does not allow optimal recover of the satellite navigation message.

The article “Fountain Codes for GNSS” by Fernández-Hernández, I., et al., Proceedings of the 30th International Technical Meeting of the Satellite Division of the Institute of Navigation (ION GNSS+2017) pages 1496 to 1507, describes the use of fountain codes to disseminate large messages in a fast and robust way using GNSS signals. Such messages are divided into K packets and each packet is encoded with an element of a random binary matrix G' having K rows and a potentially unlimited number of columns. After receiving N packets, where N>K in all cases, a receiver builds a matrix G' with the columns of G' corresponding to the received packets to reconstitute the original message.

WO-A-2012/174933 discloses an encoding method of an RS encoder in which input data is divided into a predetermined number of parallel channels of data and encoded by simultaneously performing multi-codeword parallelism on the predetermined number of channels of data. After encoding, an input control signal enable state is determined, and if enabled, the encoded data is inserted into designated positions of the pre-coded data stream with the use of a zero-padding operation. De-zero processing is performed on the data after serial processing of the parallel predetermined number of channels of data.

US-A-2016/0056920 is directed to a method for network coding that includes encoding a plurality message packets to produce a plurality of encoded packets which include, for example, the message packets and one or more parity packets. Each message packet and each encoded packet includes a plurality of symbols having an index, and each symbol of the encoded packets is generated by applying a Reed-Solomon code to the symbols of the message packets having the same index as the symbol of the encoded packets. A length of the encoded packets is the same as a length of the message packets. A wireless communication device is also disclosed which includes a network encoder for encoding a plurality of message packets to produce a plurality of encoded packets and a physical layer for transmitting the encoded packets via a wireless antenna.

Therefore, no method has been found in the literature that allows for optimal retrieval of a satellite navigation message composed of several pages, from several sources, in a fully interchangeable way and at an affordable decoding cost at the user receiver.

SUMMARY

It is therefore an object of the present disclosure to provide a method of enabling optimal retrieval of an encoded satellite navigation message comprising several pages, received from several sources, in a fully interchangeable way.

It is another object of the present disclosure to provide a satellite navigation system which implements the method of optimal retrieval of an encoded satellite navigation message comprising several pages.

In accordance with one aspect of the present disclosure, there is provided a method of generating an encoded satellite navigation message, in the form of a number of pages, for transmission to at least one user receiver via a plurality of satellites, the method comprising the steps of:

a) dividing, at a ground station, a satellite navigation message M into k pages;

b) dividing, at the ground station, each page into j symbols, the satellite navigation message M being divided into k×j symbols;

c) for each symbol position, encoding the symbols of the k pages at the ground station by encoding each column of the symbols of the pages separately for a total of j block codes, wherein each of the n pages comprises symbols from j parallel codes;

d) generating, at the ground station, an encoded satellite navigation message M' for n pages;

e) allocating, at the ground station, at least a subset of the n pages of the encoded satellite navigation message to each of the plurality of satellites;

f) transmitting, by the ground station, the allocated pages to respective ones of the plurality of satellites; and g) transmitting the allocated pages by the plurality of satellites to the at least one user receiver.

In this way, the generation of an encoded satellite navigation message in the form of a number of pages can be achieved which, when transmitted by a plurality of satellites to a user receiver, can be decoded in a fully interchangeable way and at an affordable decoding cost at the user receiver.

In an embodiment, step c) may further comprise using a block coding scheme which allows any k symbols of the n pages to be used in retrieval of the original satellite navigation message.

In an embodiment, the block codes comprise Reed-Solomon codes.

In an embodiment, step d) may further comprises attaching a cyclic redundancy check to each page to simulate a binary erasure channel.

This ensures that page reception at a user receiver is treated as being in a binary erasure channel.

In accordance with another aspect of the present disclosure, there is provided a method of decoding an encoded satellite navigation message at at least one user receiver, the encoded satellite navigation message being generated and transmitted as described above, the method comprising the steps of:

i) receiving, at each one of the at least one user receiver, pages transmitted by the plurality of satellites within the field of view of said each one of the at least one user receiver; and ii) decoding, at said each one of the at least one user receiver, the encoded satellite navigation message from the pages received from the plurality of satellites by recursively applying a decoding process thereto by decoding each column separately for a total of j block codes.

This enables the encoded satellite navigation message to be decoded in a fully interchangeable way.

In an embodiment, the block codes comprise Reed-Solomon codes.

In an embodiment, step i) may further comprise receiving different pages from different ones of the plurality of satellites.

This has the advantage that a message can be received faster than if all pages are received from the same satellite.

In an embodiment, step i) further comprises receiving the pages sequentially over time.

In accordance with a further aspect of the present disclosure, there is provided a user receiver configured for decoding an encoded satellite navigation message transmitted as different pages from a plurality of satellites in its field of view, the encoded satellite navigation message being generated and transmitted in accordance with the method as described above, the user receiver comprising means for:

receiving pages transmitted by the plurality of satellites within its field of view; and decoding the encoded satellite navigation message from the pages received from the plurality of satellites by recursively applying a decoding process thereto by decoding each column separately for a total of j block codes.

Such a configuration of a user receiver provides optimal retrieval of an encoded satellite navigation message in a fully interchangeable way and at an affordable decoding cost to the user receiver.

In an embodiment, the block codes comprise Reed-Solomon codes.

In accordance with yet another aspect of the present disclosure, there is provided a satellite navigation system for generating, transmitting and decoding an encoded satellite navigation message in the form of a number of pages, the system comprising:

a plurality of satellites;

at least one user receiver as described above; and a ground station comprising means for generating an encoded satellite navigation message, in the form of a number of pages, for transmission to the plurality of satellites, the encoded satellite navigation message being generated by:

- dividing a satellite navigation message M into k pages;
- dividing each page into j symbols, the satellite navigation message M being divided into k×j symbols;
- for each symbol position, encoding the symbols of the k pages by encoding each column of the symbols of the pages separately for a total of j Reed-Solomon codes;
- generating an encoded satellite navigation message M' for n pages, wherein each of the n pages comprises symbols from j parallel codes;
- allocating at least a subset of the n pages of the encoded satellite navigation message to each of the plurality of satellites; and
- transmitting the allocated pages to respective ones of the plurality of satellites, wherein the plurality of satellites comprises means for transmitting the allocated pages to the at least one user receiver.

Such a system enables the transmission of satellite navigation messages or data which have high parity/data ratios.

BRIEF DESCRIPTION OF THE DRAWINGS

For a better understanding of the present disclosure, reference will now be made, by way of example, to the accompanying drawings in which:

FIG. 5 illustrates Reed-Solomon implementations of the present disclosure;

FIG. 6 illustrates a comparison between the decoding cost of the method of the present disclosure and the decoding cost of conventional methods;

DETAILED DESCRIPTION

Figure 1:
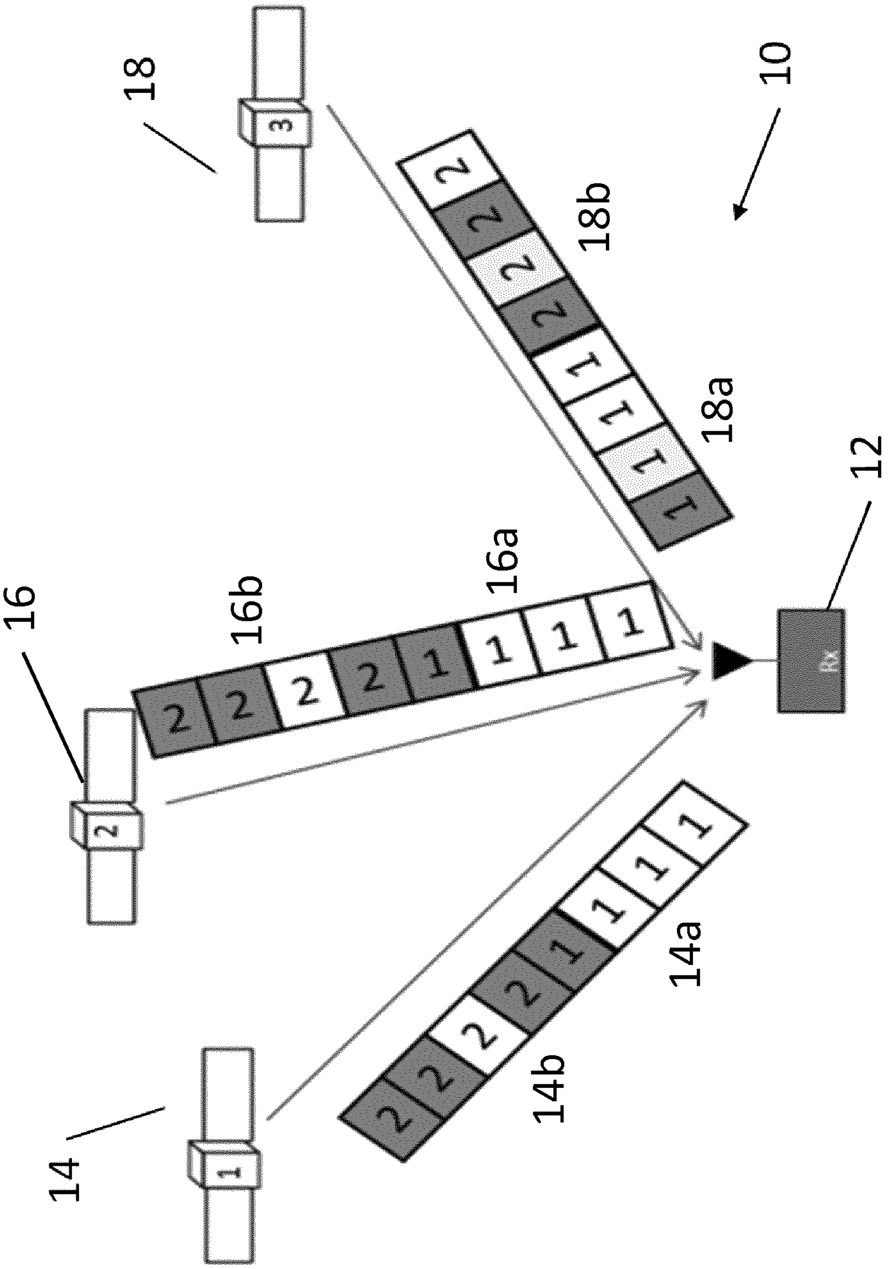
FIG. 1 illustrates a conventional satellite navigation message transmission scheme in which a given satellite navigation message is divided in blocks (termed as "message splitting")

The present disclosure will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

It is to be noted that the present disclosure is directed to solving specific problems associated with the field of satellite navigation and which may not occur in the field of satellite communications. In particular, satellite navigation data, as encoded in accordance with the present disclosure, is generally more difficult to receive than pure satellite communication signals. Generally, satellite communication signals are received at a much higher power (where satellite navigation signals are received at about −155 dBW, that is, below the thermal noise level). Due to this, the typical data rate of satellite navigation signals is in the order of a 100 bps (50 bps for GPS L1C/A), which is much lower than usual data rates used in satellite communication systems. In addition, satellite communication messages are generally transmitted from a single source, and satellite navigation signals and data have to be available at said low power to both static and dynamic users in all environments, including air, sea, and terrestrial, the latter including tree canopy and urban canyons.

With low data reception rates in satellite navigation systems, the present disclosure solves the problem of transmitting long messages, for example, of the order of thousands or tens of thousands of bits, with these signals needing to be received in degraded environments through a very high data redundancy yet at no overhead and low decoding complexity, which cannot otherwise achieved with state-of-the-art methods. RS (or similar) standard code implementations provide a very low parity with respect to what is required for to solve the problem of the present disclosure. Typically, the present disclosure requires a parity/data ratio between 1/10 and 1/6, for an already long message. While this may be achieved with RS (or similar) codes with longer symbols, for example, 16 bits, these implementations are not standard and are more difficult to decode at the user receiver. In particular, the method of the present disclosure is applied to long messages with a high parity/data ratio as required to solve the specific satellite navigation problem of transmitting long messages with weak signals in degraded environments, that is, with potentially very high error rates.

Moreover, a fundamental difference over the prior art is that the method of the present disclosure utilizes parallel processing at an "inter-symbol" level, that is, for several symbols, not at an "intra-symbol" level, that is, at bit level. By acting at full symbol level, it is possible to parallelize as many codes as necessary. The method of the present disclosure utilizes a parallelization of 54, that is, (448−16)/8 vectors, which is not viable with methods known from the prior art.

By utilizing inter-symbol parallelization, a more flexible method of decoding satellite navigation messages or signals can be obtained.

Furthermore, in comparison with satellite communication systems, satellite navigation systems need to transmit messages with a very high redundancy rate to address high error rates and to transmit those messages from more than one source or satellite.

The term "Open Sky" as used herein refers to an environment where signals from four transmitting satellites are received with a page error rate of 0.5% for each satellite.

The term "Soft Urban" as used herein refers to an environment where signals from four transmitting satellites are received with page error rates of 0.5%, 1%, 10% and 20% respectively for the four satellites.

The term "Hard Urban" as used herein refers to an environment where signals from two transmitting satellites are received with a page error rate of 10% and 20% respectively for the two satellites.

The term "fading channel" refers to a communication that experiences a variation in the attenuation of a signal with multiple variables, such as, time, geographical position and radio frequency.

The term "C/NAV" refers to the commercial navigation messages broadcast by Galileo satellites on frequency E6.

The term "I/NAV" refers to the integrity navigation messages broadcast by Galileo satellites on frequencies E1 and E5.

The term "parity/data ratio" refers to the amount of parity bits versus the amount of information bits in the encoded message.

The terms "block codes" or "block coding schemes" refer to codes or coding schemes in which parallelization can be achieved. The present disclosure is described with reference to Reed-Solomon codes but is not limited thereto. For example, the Bose-Chaudhuri-Hocquengem (BCH) coding scheme may also be implemented.

The term "binary erasure channel" or "BEC" refers to a common communications channel model in which a transmitter sends a bit (a "0" or a "1") and the receiver either receives the bit or it receives a message that the bit was not received or "erased". In reality, packets of bits are transmitted by the transmitter and the receiver either receives the packet or the packet is erased, in the present method, the C/NAV page CRC is checked and the page is discarded if the CRC fails.

The approach proposed in the article "European GNSS (Galileo) Open Service Signal In Space Interface Control Document, (OS SIS ICD V1.3)" is shown in FIG. 1. In FIG. 1, a satellite navigation system 10 comprising a user receiver 12 and three satellites 14, 16, 18 is shown. As shown, each satellite 14, 16, 18 transmits a satellite navigation message to the user receiver 12 in two four-page chunks. This is known as message splitting. The two four-page chunks are indicated as 14*a* and 14*b*, 16*a* and 16*b*, and, 18*a* and 18*b* from respective ones of satellites 14, 16 and 18. Here, the block data is encoded interchangeably so that any page contributes to it; however, due to channel impairments, the user receiver 12 only receives the blocks shown in grey. In this example, the user receiver 12 would not be able to receive all of the chunks 14*a*, 14*b*, 16*a* 16*b*, 18*a* and 18*b* from any one of satellites 14, 16, 18, and, therefore would not be able to decode the satellite navigation message. However, if the pages were fully interchangeable as described below, it would be possible to decode the satellite navigation message as will be described in more detail below.

Figure 2:
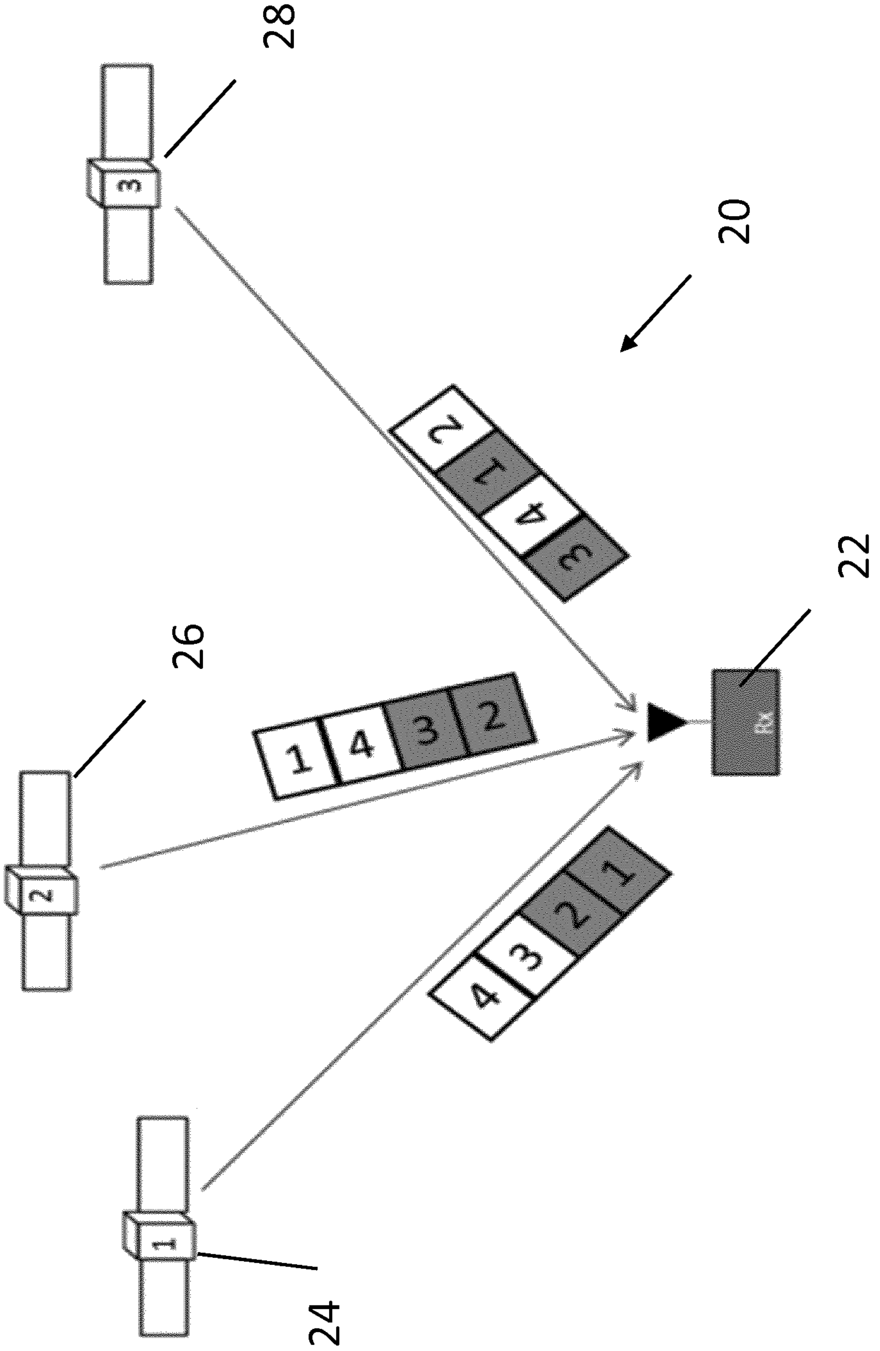
FIG. 2 illustrates a conventional satellite navigation message transmission scheme based on page offsetting in which each satellite transmits the same satellite navigation message with a different offset.

As described above, page offsetting does not allow optimal recovery of the satellite navigation message. FIG. 2 illustrates a satellite navigation system 20 which is similar to the system 10 of FIG. 1 and comprises a user receiver 22 and three satellites 24, 26, 28. However, in this case, each satellite 24, 26, 28 transmits a 4-page satellite navigation message with a page offsetting of 0, 1, 2 respectively. In this example, the user receiver receives only half of the pages (shown in grey) from each of the satellites, and, therefore would not be able to receive the full satellite navigation message. As mentioned above with reference to FIG. 1, if all pages are interchangeable, the satellite navigation message could be received in 2 seconds.

However, page offsetting alone does not allow reception as the user receiver should wait for the re-broadcast of the satellite navigation message, if possible, with its associated delay. The system cannot control which satellites are seen by each user receiver and there will always be users receiving a combination of pages which does not allow for a successful decoding or demodulation of the satellite navigation message.

The problem which is solved by the present disclosure can be mathematically defined as follows: Let there be a high accuracy service (HAS) satellite navigation message M composed of k pages ($M_1, \ldots, M_k$) which has to be transmitted by several navigation satellites at a given time through a binary erasure channel, the BEC assuming that a C/NAV page is either received correctly or is discarded. The BEC is modelled by checking the C/NAV page CRC and discarding the page is the CRC fails.

The satellite navigation message M is encoded into a coded satellite navigation message C, of n pages, ($C_1, \ldots, C_n$) where n>k, and transmitted at the same time by multiple satellites so that any k retrieved pages of C received from any satellite enables decoding of the original satellite navigation message M, allowing full page interchangeability in the satellite navigation message reception. The method must be valid for different message lengths, and the decoding process must be affordable in a user receiver.

Figure 3:
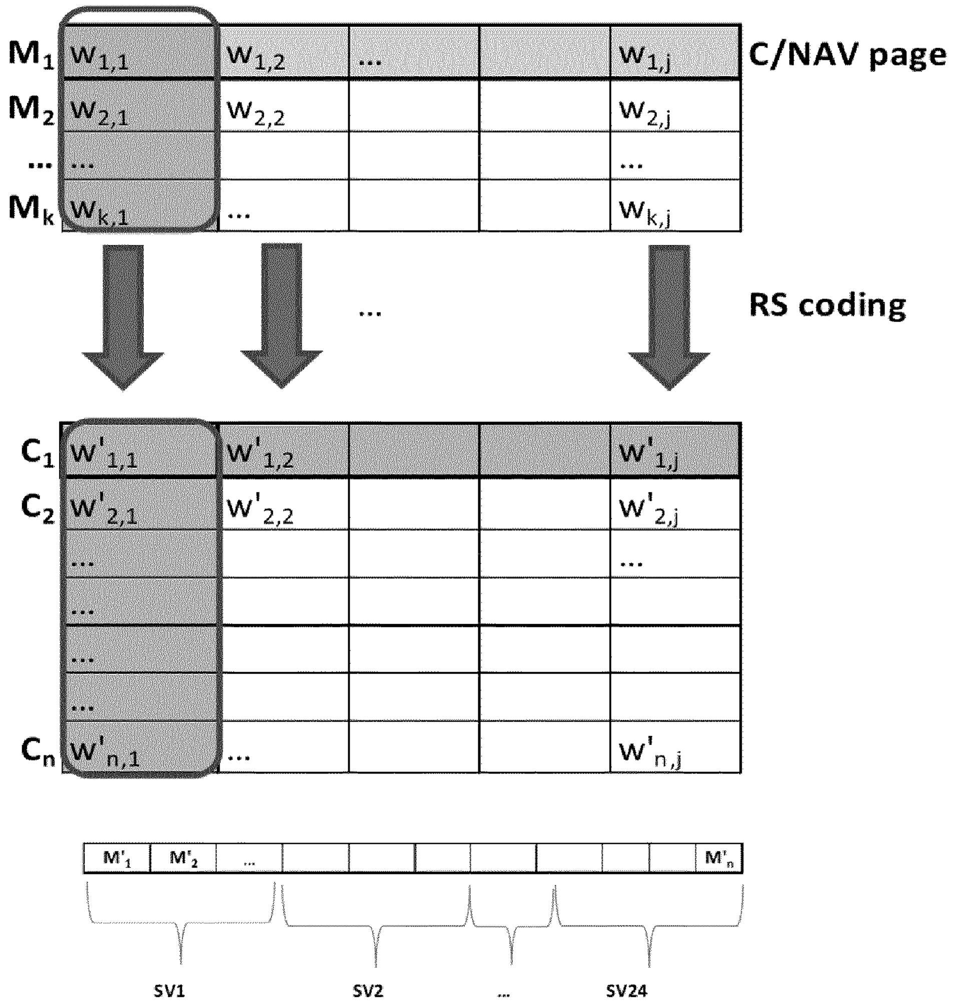
FIG. 3 illustrates a transmission method in which all the symbols in a given position in a page are encoded in a separate code.

The method of the present disclosure is based on the following steps and uses parallel processing at an inter-symbol level so that there is no restriction:

- Divide a satellite navigation message M into k pages ($M_1, \ldots, M_k$)
- Divide each page into j symbols so that the full satellite navigation message M is divided into k×j symbols ($w_{1,1}, \ldots, w_{k,j}$)
- For each symbol position c=1, . . . , j, encode the symbols of the k pages ($w_{1,c}, \ldots, w_{k,c}$) into ($w'_{1,c}, \ldots, w'_{n,c}$) with a block coding scheme having the property that any k symbols of the n encoded symbols can be used to retrieve the original satellite navigation message
- Generate a full encoded satellite navigation message M' ($w'_{1,1}, \ldots, w'_{n,j}$), of n pages, where each page is composed of symbols from j parallel codes
- Attach a CRC or similar check to each page so that page reception is treated as in a binary erasure channel
- Allocate the n pages of M', or a subset of them, to different satellites, and transmit the satellite navigation message through the satellites, so that each satellite transmits different pages
- At the user receiver side, when k pages of M' are successfully received from any of the visible satellites, decode satellite navigation message M by applying the decoding process recursively j times An encoding and message-to-satellite allocation process is shown in FIG. 3 where n pages ($C_1, \ldots, C_n$) are encoded in symbols $w_{1,1}$ to $w_{n,j}$ with j being the total number of symbols in a C/NAV page. For example, j may be 52 for 448 bits minus the 16-bit header. Instead of using the same RS code for all symbols in the satellite navigation message, each column ($w_{1,1}, \ldots, w_{n,1}$; $w_{1,2}$; . . . , $w_{n,2}$; etc.) is encoded and decoded separately for a total of j RS codes. The pages $C_{i=1,n}$, or a subset thereof, are transmitted sequentially over time by different satellites which allows the user receiver to identify each $C_i$. When the user receiver receives k pages, j codes will be decoded to provide the satellite navigation message using parallelization at the inter-symbol level.

Figure 4:
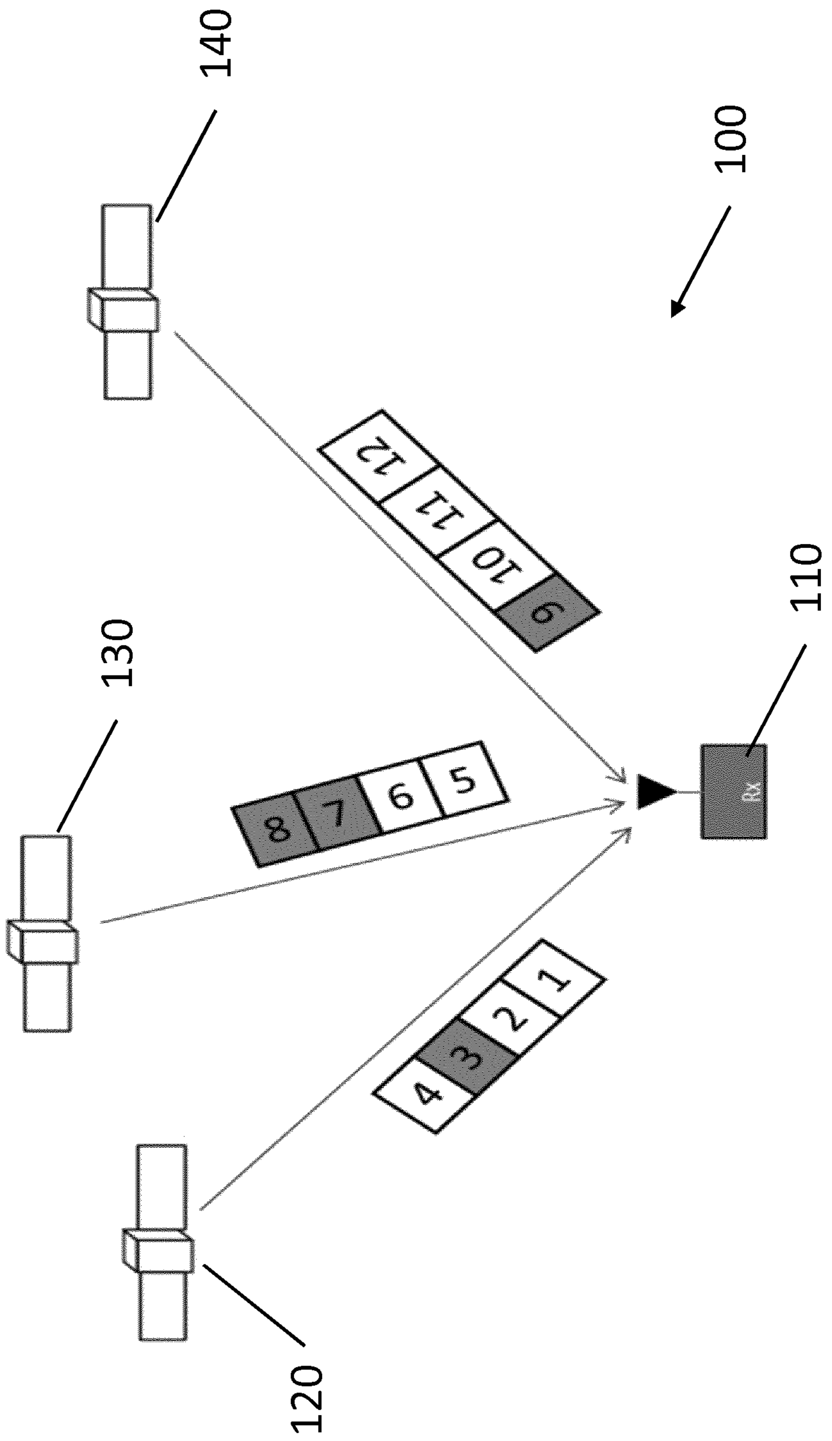
FIG. 4 illustrates the reception process in fading channels in which a 4-page satellite navigation message is encoded into 12 pages and transmitted by 3 satellites, and the user receiver recomposes the satellite navigation message by receiving only 4 pages.

The reception process in fading channels is shown in FIG. 4, where a 4-page satellite navigation message is encoded into 12 pages and transmitted by 3 satellites, and the receiver recomposes the satellite navigation message by receiving only 4 pages. In FIG. 4, a satellite navigation system 100 is shown which comprises a user receiver 110 and three satellites 120, 130, 140. Each satellite 120, 130, 140 transmits four pages to the user receiver 110. However, due to fading channels, only the pages indicated in grey are received by the user receiver 110 and these pages are used to decode and recompose the original 4-page satellite navigation message.

Reed-Solomon codes have the property of allowing the recovery of a satellite navigation message with any k symbols out of the n transmitted symbols. Therefore, one embodiment of the present disclosure is based on Reed-Solomon coding. In order to achieve full page interchangeability with multiple satellites, n has to be much bigger than k, that is, the satellite navigation message has to be coded with a lot of parity data so different satellites do not transmit the same pages. This is described by Westall et al. in "An introduction to Galois Fields and Reed-Solomon Coding", School of Computing Clemson University, SC (2010): 29634-1906.

Based on current estimations of the maximum message size for a precise point positioning (PPP) message transmitted in the Galileo E6B signals at 448 bps, it can be assumed that:

- A maximum satellite navigation message length ($k_{max}$) of 20 pages, or 8640 bits, or 1080 bytes (e.g. an iono message), where each page can provide 432 bits (54 bytes), plus 16 bits for a header used to identify the information contained in the page, for a total of 448 bits.

A maximum of 20 transmitting satellites, as per Galileo constellation capabilities, which would require a parity/data ratio of 20/1.

However, in order to reduce the amount of parity/data ratio of 20/1, it can be assumed that satellites in an opposite slot of an orbit cannot be observed by the same user receiver. This already reduces the redundancy by half (from 20 to 10). Other assumptions are that satellites can be evenly distributed in the sky, and that, with a clean sky, a receiver on Earth can see at most ⅓ of the 20 Galileo connected satellites. In this case, a RS message may have a 6/1 parity/data ratio for a total (data+parity) of 7560 bytes. However, most standard RS coding approaches are based on GF($2^m$), where m=8, which implies that no more than 256 bytes can be encoded. Other implementations with m=16 or m=32 are possible, but they complicate Galois field arithmetic (especially polynomial multiplication for m=32), increasing receiver decoding cost and storage requirements.

Some examples with different message lengths, up to 20 pages, are provided in FIG. 5. In the first example, a 20-page message is transmitted at a code rate of 1/5, that is, guaranteeing page interchangeability for up to 5 satellites in view of the user receiver. 100 8-bit symbol messages are encoded, with 20 data symbols and 80 parity symbols, fitting well in many RS codes, as for example, RS(255,161,8) as described by Cheung et al. in "End-to-end system consideration of the Galileo image compression system" (International Geoscience and Remote Sensing Symposium, Vol. 2, Institute of Electrical & Electronics Engineers, INC (IEE), 1996). The excess information symbols would be filled with zeros (for example, in the 20-page example, out of the 161 data symbols, only 20 would be used, and 141 would be filled with zeros) as described by B. E. Schotsch in "Specification of Outer Reed-Solomon Encoding of the CED in the Galileo E1 I/NAV Message", 2017.

In the second example, a 16-page satellite navigation message is transmitted at a code rate of 1/6. 96 8-bit symbol messages are encoded with 16 data symbols and 80 parity symbols with excess information symbols being filled with zeros. In the third example, a 10-page satellite navigation message is transmitted at a code rate of 1/8. 80 8-bit symbol messages are encoded with 10 data symbols and 70 parity symbols with excess information symbols being filled with zeros.

In the fourth example with less redundancy, as proposed in the article by Schotsch mentioned above, a 18-page satellite navigation message is transmitted at a 1/4 code rate with an I/NAV RS code, RS(255,195,8), which provides 60-symbol parity.

One of the advantages of the method of the present disclosure, compared to a standard RS coding in a single code, is the significantly lower decoding cost. Repeating j times the decoding process linearly increases decoding cost with respect to a single decoder iteration, but as the satellite navigation message is much shorter, decoding cost exponentially decreases. The decoding cost is estimated as the cost of inverting a k×k matrix and the cost of solving a linear k×k system. The matrix inversion cost is usually estimated as $O(k^3)$, which is the cost of the Gaussian Elimination method. The cost of solving the linear system is estimated as $O(k^2)$.

A comparison with standard methods is shown in FIG. 6. The comparison is based on a data page length of 432 bits and message sizes of k=20 and k=4. Three implementations are selected:

A single RS code for the whole satellite navigation message. m=8 for a short message ($n=216<2^8$), and m=16 for a long message ($2^8<n<2^{16}$). This is termed "Standard1".

An implementation based on splitting the satellite navigation message into 5 chunks of 4-pages, where each chunk is encoded separately. This is termed "Standard2".

The method of the present disclosure is termed "MRSC" (multiple RS coding).

In FIG. 6, m represents the symbol size (GF size is $2^m$), "max pages/code" represents the number of C/NAV pages that are (totally or partially, in the MRSC case) encoded with a RS code; "parallel codes/msg" is the number of RS codes that encode a given satellite navigation message in parallel; "chunks" is the number of RS codes that encode a given satellite navigation message; "codes" is the total number of codes for the satellite navigation message, "k" is the total number of bytes encoded per code; and "dec. ops/code" is the number of decoding operations per code ($O(k^3)+O(k^2)$). As shown, the implementation of the present disclosure (MRSC) has a much lower decoding cost than the other implementations ("Standard1" and "Standard2") for the same satellite navigation message.

Figure 7A:
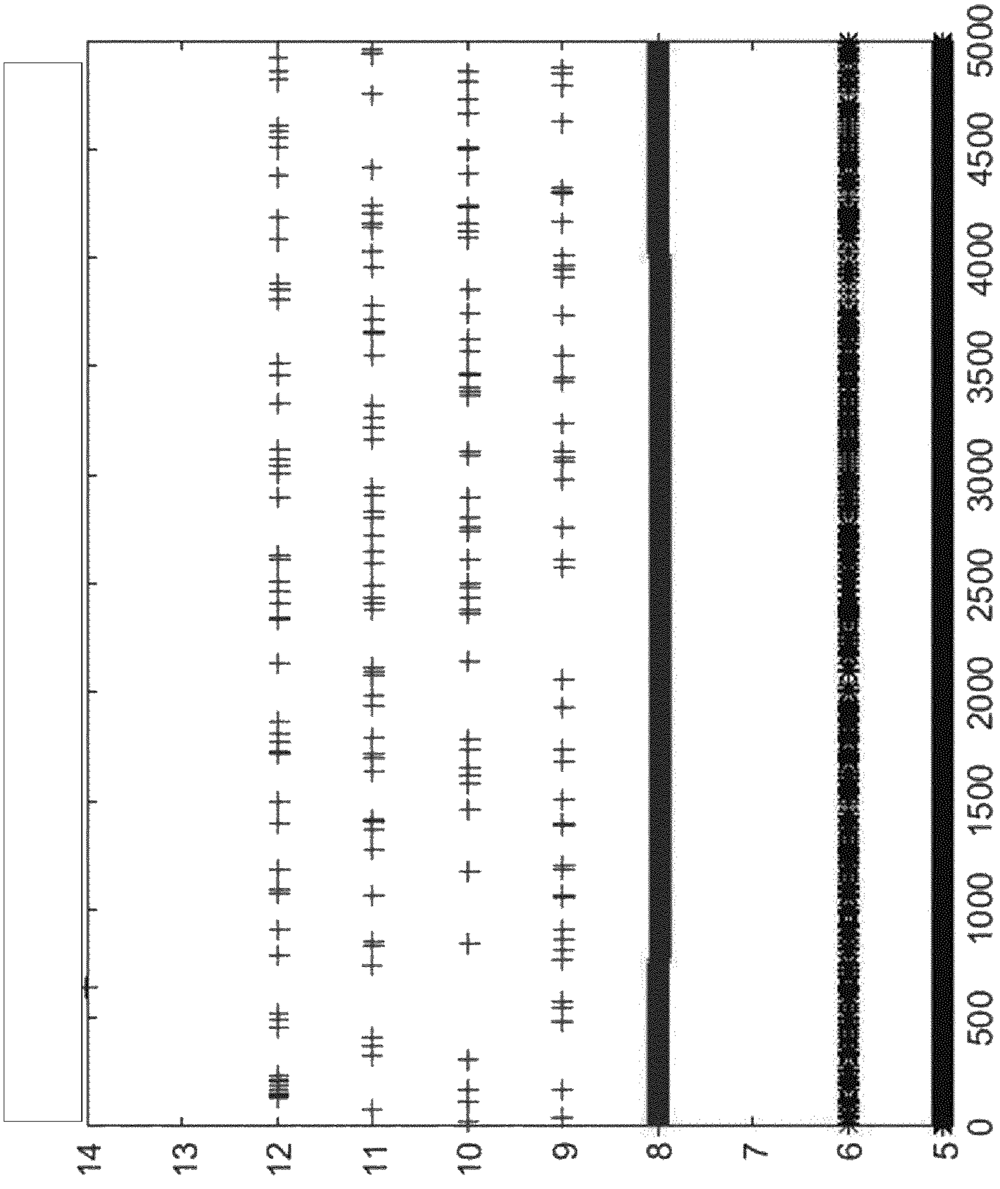
FIGS. 7*a*, 7*b* and 7*c* respectively illustrate a comparison between the reception time of the method of the present disclosure (indicated by asterisks "*" in black) and the reception time of a standard method (indicated by crosses "+" in grey) for and "Open Sky" scenario, a "Soft Urban" scenario and a "Hard Urban" scenario.
Figure 7B:
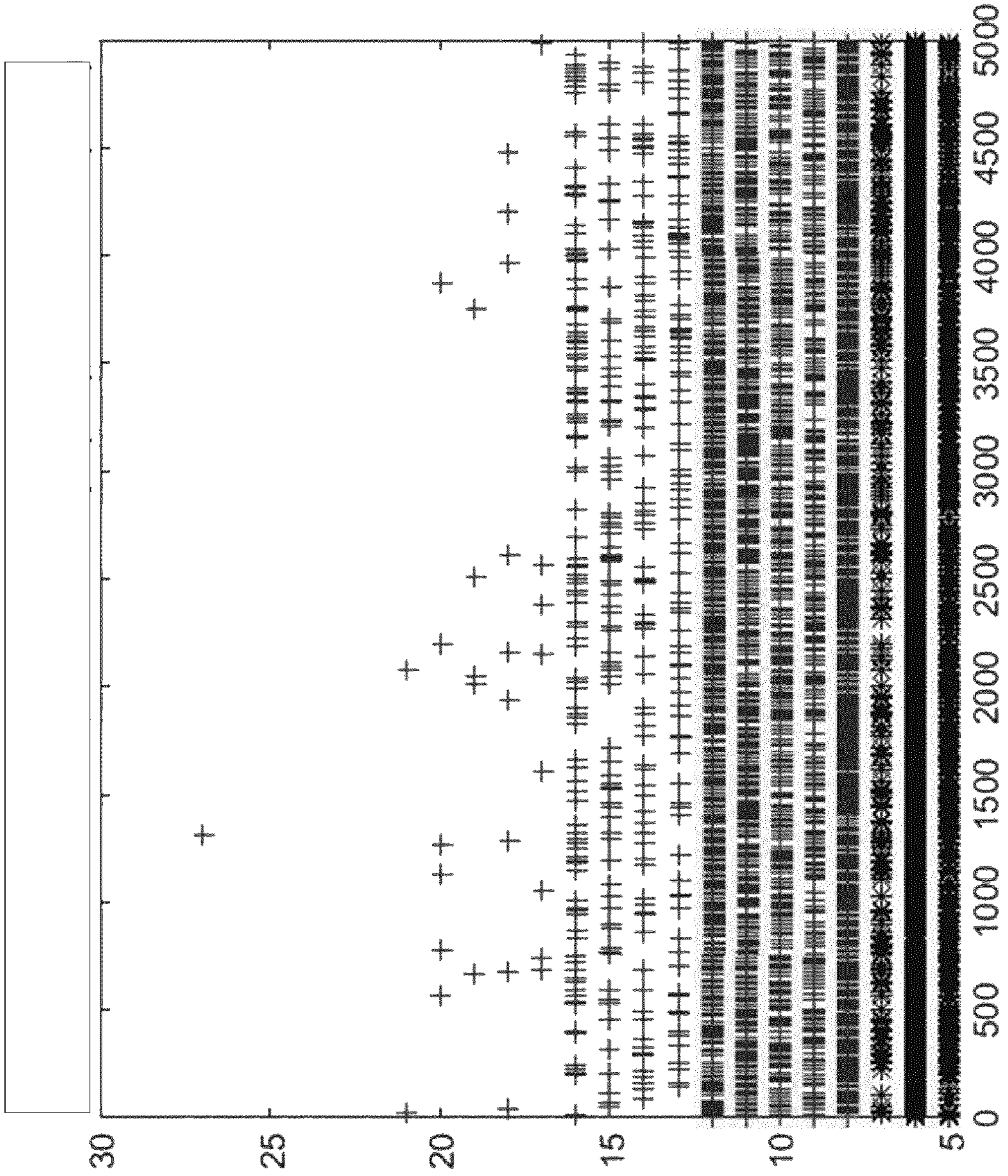
Figure 7C:
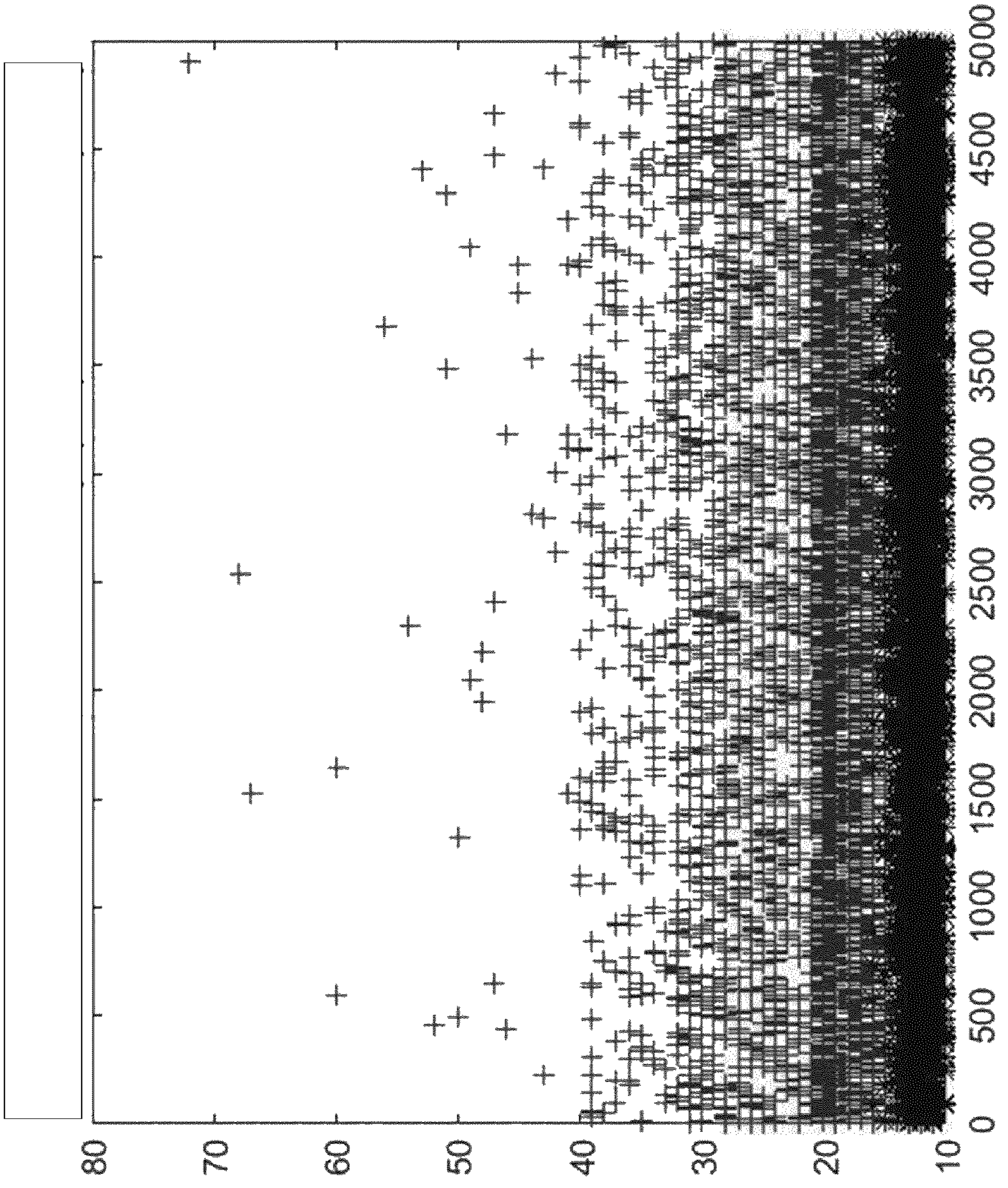

Another advantage of the method of the present disclosure is the improved reception capabilities under fading conditions. The reception of a 20-page satellite navigation message through MRSC compared to an equivalent conventional method in five 4-page chunks is shown in FIGS. 7*a* to 7*c*. Each of FIGS. 7*a* to 7*c* were modelled using a Monte-Carlo simulation run with 5000 instances, measuring the time to decode the satellite navigation message in each case.

FIG. 7*a* illustrates a comparison between the reception time in the method of the present disclosure, indicated as "*" in black, and the reception time of a 4-page/5-chunk method, indicated as "+" in grey, for an "open sky" case with four satellites in view of the user receiver. In the conventional method, the chunk sequence is optimized so that the satellites transmit complementary chunk sequences for the user receiver. A page error rate of 0.5% was obtained for each of the four satellites.

FIG. 7*b* is similar to FIG. 7*a* but for a "soft urban" case with four satellites in view of the user receiver. Page error rates of 1%, 5%, 10% and 20% were obtained for respective ones of the satellites.

FIG. 7*c* is similar to FIGS. 7*a* and 7*b* but for a "hard urban" case with only two satellites in view of the user receiver. Page error rates of 10% and 20% were obtained for respective ones of the satellites.

As shown in FIGS. 7*a* to 7*c*, the method of the present disclosure improves significantly the message reception robustness and the satellite navigation message is received much more quickly.

A specific implementation of the method of the present disclosure can based on every page including a header, with a message ID field, a message length field, and a Page ID field.

Another specific implementation, in which the header size is reduced, can be based on defining a satellite/time matrix for a given number of satellites and time, so that the Page ID field can be defined from the matrix, instead of occupying space in the header, thereby allowing the possibility to have long encoded satellite navigation messages. This is illustrated in FIG. 8.

Figure 8:
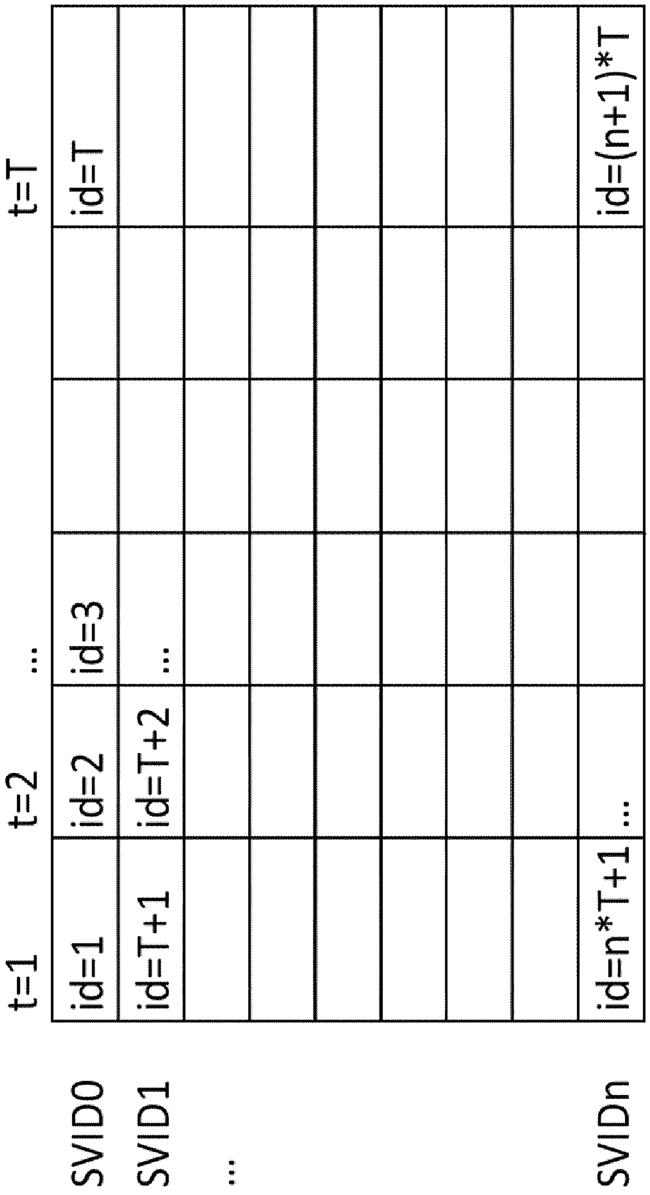
FIG. 8 illustrates a scheme for defining the page ID of the satellite navigation message based on the satellite ID of the transmitting satellite and the time, both of which are known a priori by the user receiver.

FIG. 8 illustrates how to identify the pages of a message composed of at most (n+1)*T pages by just identifying the satellite identification (n) and time (between 1 and T) without necessarily having to transmit this information in the header.

Another specific implementation may include a page header where the coding scheme that is encoding the satellite navigation message is defined in the header, thereby allowing multiple schemes.

Another specific implementation includes the encoding of a high accuracy message based on grouping message subtypes in 3 messages: one message for the satellite mask, orbit corrections, biases and user ranging accuracy (URA); one message for ionospheric corrections; and one message for the satellite clock corrections composed of 1 to 3 pages, depending on the amount of satellites in the satellite mask.

Another implementations include other block codes different than RS, or other symbol lengths different than 8-bits (e.g. 16 bits or 32 bits, as both are available for RS).

In another implementation, the satellite navigation message encoded is not a high accuracy message, but another common satellite navigation message transmitted by a GNSS constellation, such as a digital signature or an almanac.

Another implementation allows for the interleaving of several different satellite navigation messages from different satellites in time. This means that, instead of transmitting one message at a given time interval, the system can transmit several messages during that time interval, and, the header of a particular message identifies that message with a particular message ID.

Figure 9:
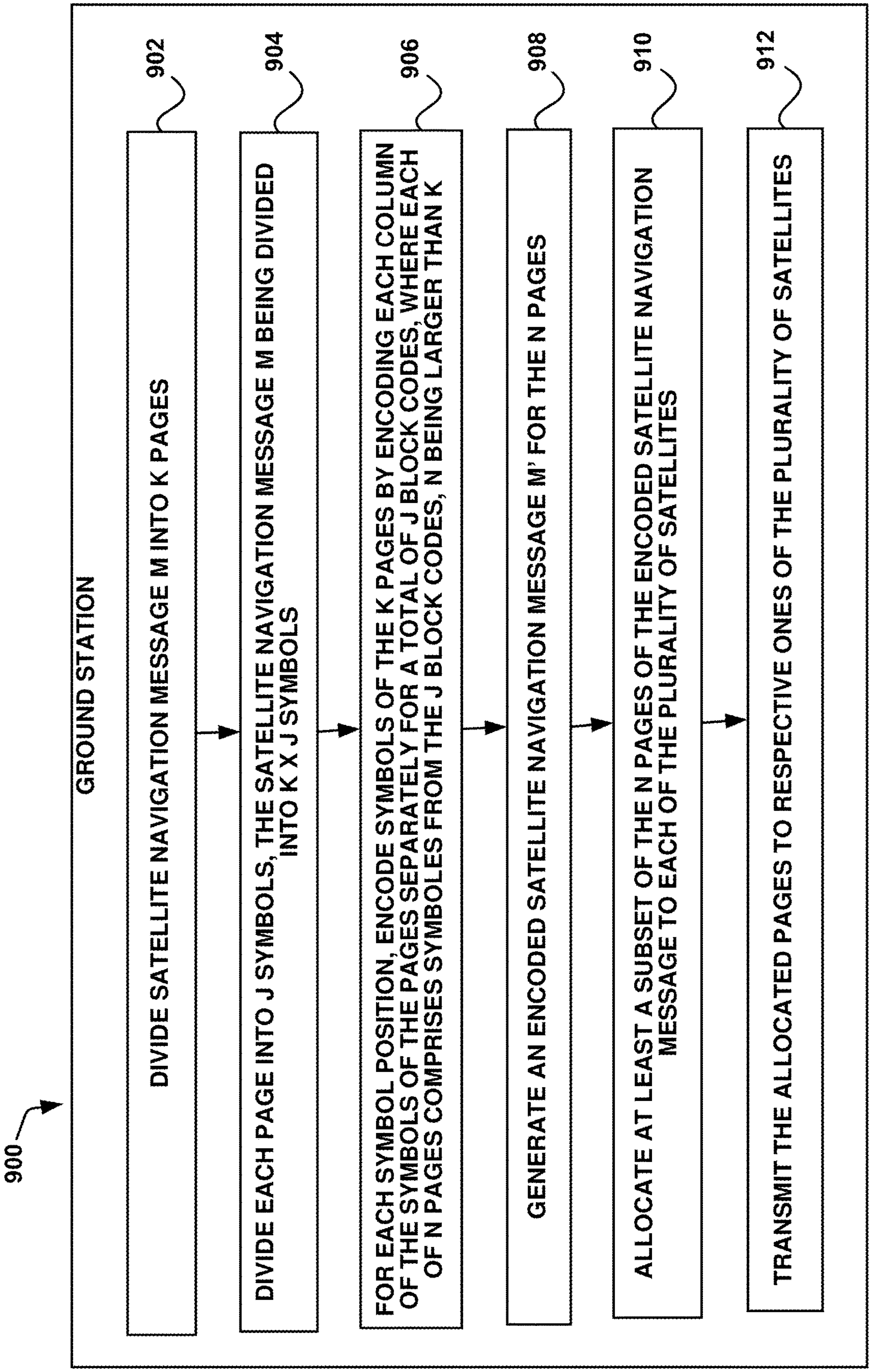
FIG. 9 is a flow chart that illustrates a method of the present disclosure.

FIG. 9 is a flow chart that illustrates a method of the present disclosure performed at a ground station. The method includes, at step 902, dividing, at a ground station 900, a satellite navigation message M into k pages; at step 904, dividing, at the ground station, each page into j symbols, the satellite navigation message M being divided into k×j symbols; at step 906, for each symbol position, encoding the symbols of the k pages at the ground station by encoding each column of the symbols of the pages separately for a total of j block codes, wherein each of n pages comprises symbols from the j block codes, n being larger than k; at step 908, generating, at the ground station, an encoded satellite navigation message M' for the n pages; at step 910, allocating, at the ground station, at least a subset of the n pages of the encoded satellite navigation message to each of the plurality of satellites; and at step 912, transmitting, by the ground station, the allocated pages to respective ones of the plurality of satellites.

The invention claimed is:

1. A method of generating an encoded satellite navigation message, in the form of a number of pages, for transmission to at least one user receiver via a plurality of satellites, the method comprising the steps of:

a) dividing, at a ground station, a satellite navigation message M into k pages;

b) dividing, at the ground station, each page into j symbols, the satellite navigation message M being divided into k×j symbols;

c) for each symbol position, encoding the symbols of the k pages at the ground station by encoding each column of the symbols of the pages separately for a total of j block codes, wherein each of n pages comprises symbols from the j block codes, n being larger than k;

d) generating, at the ground station, an encoded satellite navigation message M' for the n pages;

e) allocating, at the ground station, at least a subset of the n pages of the encoded satellite navigation message to each of the plurality of satellites;

f) transmitting, by the ground station, the allocated pages to respective ones of the plurality of satellites; and g) transmitting the allocated pages by the plurality of satellites to the at least one user receiver.

2. The method according to claim 1, wherein step c) further comprises using a block coding scheme which allows any k symbols of the n pages to be used in retrieval of the original satellite navigation message.

3. The method according to claim 1, wherein the block codes comprise Reed-Solomon codes.

4. The method according to claim 1, wherein step d) further comprises attaching a cyclic redundancy check to each page to simulate a binary erasure channel.

5. The method of claim 1 further comprising:

decoding the encoded satellite navigation message at at least one user receiver, the encoded satellite navigation message being generated in accordance with the decoding comprising the steps of:

i) receiving, at each one of the at least one user receiver, pages transmitted by the plurality of satellites within the field of view of said each one of the at least one user receiver; and ii) decoding, at said each one of the at least one user receiver, the encoded satellite navigation message from the pages received from the plurality of satellites by recursively applying a decoding process thereto by decoding each column separately for a total of j block codes.

6. The method according to claim 5, wherein the block codes comprise Reed-Solomon codes.

7. The method according to claim 5, wherein step i) further comprises receiving different pages from different ones of the plurality of satellites.

8. The method according to claim 5, wherein step i) further comprises receiving the pages sequentially over time.

9. A user receiver configured for decoding an encoded satellite navigation message transmitted as different pages from a plurality of satellites in its field of view, the encoded satellite navigation message being generated and transmitted in accordance with the method of claim 1, the user receiver being configured for:

receiving pages transmitted by the plurality of satellites within its field of view; and decoding the encoded satellite navigation message from the pages received from the plurality of satellites by recursively applying a decoding process thereto by decoding each column separately for a total of j block codes.

10. The user receiver according to claim 9, wherein the block codes comprise Reed-Solomon codes.

11. A satellite navigation system for generating, transmitting and decoding an encoded satellite navigation message in the form of a number of pages, the system comprising:

a plurality of satellites;

at least one user receiver; and a ground station configured for generating an encoded satellite navigation message, in the form of a number of pages, for transmission to the plurality of satellites, the encoded satellite navigation message being generated by:

dividing a satellite navigation message M into k pages;

dividing each page into j symbols, the satellite navigation message M being divided into k×j symbols;

for each symbol position, encoding the symbols of the k pages by encoding each column of the symbols of the pages separately for a total of j block codes;

generating an encoded satellite navigation message M' for n pages, n being larger than k, wherein each of the n pages comprises symbols from the j block codes;

allocating at least a subset of the n pages of the encoded satellite navigation message to each of the plurality of satellites; and transmitting the allocated pages to respective ones of the plurality of satellites, wherein the plurality of satellites comprises means for transmitting the allocated pages to the at least one user receiver.

12. The satellite navigation system according to claim 11, wherein the block codes comprise Reed-Solomon codes.

* * * * *